(12) United States Patent
Anthony

(10) Patent No.: US 11,200,992 B2
(45) Date of Patent: Dec. 14, 2021

(54) DRY STAND-BY LIQUID CONTROL SYSTEM FOR A NUCLEAR REACTOR

(71) Applicant: GE-Hitachi Nuclear Energy Americas LLC, Wilmington, NC (US)

(72) Inventor: Gary M. Anthony, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 86 days.

(21) Appl. No.: 16/729,968

(22) Filed: Dec. 30, 2019

(65) Prior Publication Data

US 2021/0202114 A1    Jul. 1, 2021

(51) Int. Cl.

| | |
|---|---|
| *G21C 9/033* | (2006.01) |
| *G21C 9/02* | (2006.01) |
| *G21C 1/08* | (2006.01) |
| *G21D 3/04* | (2006.01) |
| *G21C 15/16* | (2006.01) |
| G21C 13/02 | (2006.01) |
| G21C 15/18 | (2006.01) |
| G21C 7/22 | (2006.01) |

(52) U.S. Cl.
CPC ............ *G21C 9/033* (2013.01); *G21C 9/02* (2013.01); *G21C 15/16* (2013.01); *G21C 1/084* (2013.01); *G21C 7/22* (2013.01); *G21C 13/02* (2013.01); *G21C 15/18* (2013.01); *G21D 3/04* (2013.01)

(58) Field of Classification Search
CPC .......... G21C 1/084; G21C 9/02; G21C 9/033; G21C 13/02; G21C 15/16; G21C 15/18; G21C 7/22; G21D 3/04
See application file for complete search history.

(56) References Cited

U.S. PATENT DOCUMENTS

| | | |
|---|---|---|
| 5,499,278 A | 3/1996 | Gluntz |
| 2010/0232560 A1* | 9/2010 | Sano ................ G21C 17/0225 376/210 |
| 2013/0170599 A1 | 7/2013 | Muller et al. |
| 2015/0187448 A1 | 7/2015 | Swantner et al. |
| 2016/0019989 A1* | 1/2016 | Cook .................... G21C 15/18 376/282 |
| 2018/0144836 A1* | 5/2018 | Lin-Hendel ............. G21D 1/02 |

OTHER PUBLICATIONS

"Duke Energy Final Safety Analysis Report—Brunswick Steam Electric Plant"; Units 1 and 2, Revision 25; Chapter 9, Sections 9.3.4-9.3.4.6, pp. 1618-1625 (pp. 61-68 of Ch. 9, relevant portion); Aug. 11, 2016; https://www.nrc.gov/docs/ML1825/ML18250A024.pdf.
International Search Report and Written Opinion dated Jun. 11, 2021 (corresponding to PCT/US2020/067144).

\* cited by examiner

*Primary Examiner* — Darlene M Ritchie
(74) *Attorney, Agent, or Firm* — Harness, Dickey & Pierce, P.L.C.

(57) ABSTRACT

A boiling water reactor system includes a reactor vessel including a reactor core. A steam line is in communication with the reactor core and a turbine that is connected to an electrical generator. A dry standby liquid control system includes a standby vessel containing dry powder containing boron and including a high pressure water supply in communication with the standby vessel via a first closed valve, wherein the standby vessel is in communication with the reactor vessel via a second closed valve.

15 Claims, 2 Drawing Sheets

DRY STAND-BY LIQUID CONTROL SYSTEM FOR A NUCLEAR REACTOR

BACKGROUND

Field

The present disclosure relates to a dry stand-by liquid control system for a nuclear reactor.

Description of Related Art

This section provides background information related to the present disclosure which is not necessarily prior art.

A boiling water reactor (BWR) uses demineralized water as a coolant and neutron moderator. Heat is produced by nuclear fission in the reactor core, and this causes the cooling water to boil, producing steam. The steam is directly used to drive a turbine, after which it is cooled in a condenser and converted back to liquid water. This water is then returned to the reactor core, completing the loop.

A stand-by liquid control system (SLCS) is a backup to the reactor protection system. In the event that the reactor protection system is unable to scram the reactor for any reason, the SLCS will inject a liquid boron solution into the reactor vessel to bring it to a guaranteed shutdown state prior to exceeding any containment or reactor vessel limits. SLCS, in combination with the alternate rod insertion system, the automatic recirculation pump trip and manual operator actions to reduce water level in the core will ensure that the reactor vessel does not exceed its ASME code limits, the fuel does not suffer core damaging instabilities, and the containment does not fail due to overpressure during the most extreme full power scram failure.

Current stand-by liquid control systems consist of a tank containing a slurry of borated water as a neutron absorber, protected by explosively-opened valves and redundant pumps, allowing the injection of the borated water into the reactor against any pressure within; the borated water will shut down a reactor and maintain it shut down. The SLCS is a system that is never meant to be activated unless all other measures have failed. The current SLCS systems require that the borated water slurry be periodically tested and the tank be maintained in a ready state for activation in case it is needed. Accordingly, it is desirable to provide a standby liquid control system that is easier to maintain.

SUMMARY

This section provides a general summary of the disclosure, and is not a comprehensive disclosure of its full scope or all of its features.

A boiling water reactor system includes a reactor vessel including a reactor core. A steam line is in communication with the reactor core and a turbine that is connected to an electrical generator. A dry standby liquid control system includes a standby vessel containing dry powder containing boron and including a high pressure water supply in communication with the standby vessel via a first closed valve. The standby vessel is in communication with the reactor vessel via a second closed valve. The dry standby liquid control system reduces the maintenance requirements that are associated with the wet slurry-type standby liquid control system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
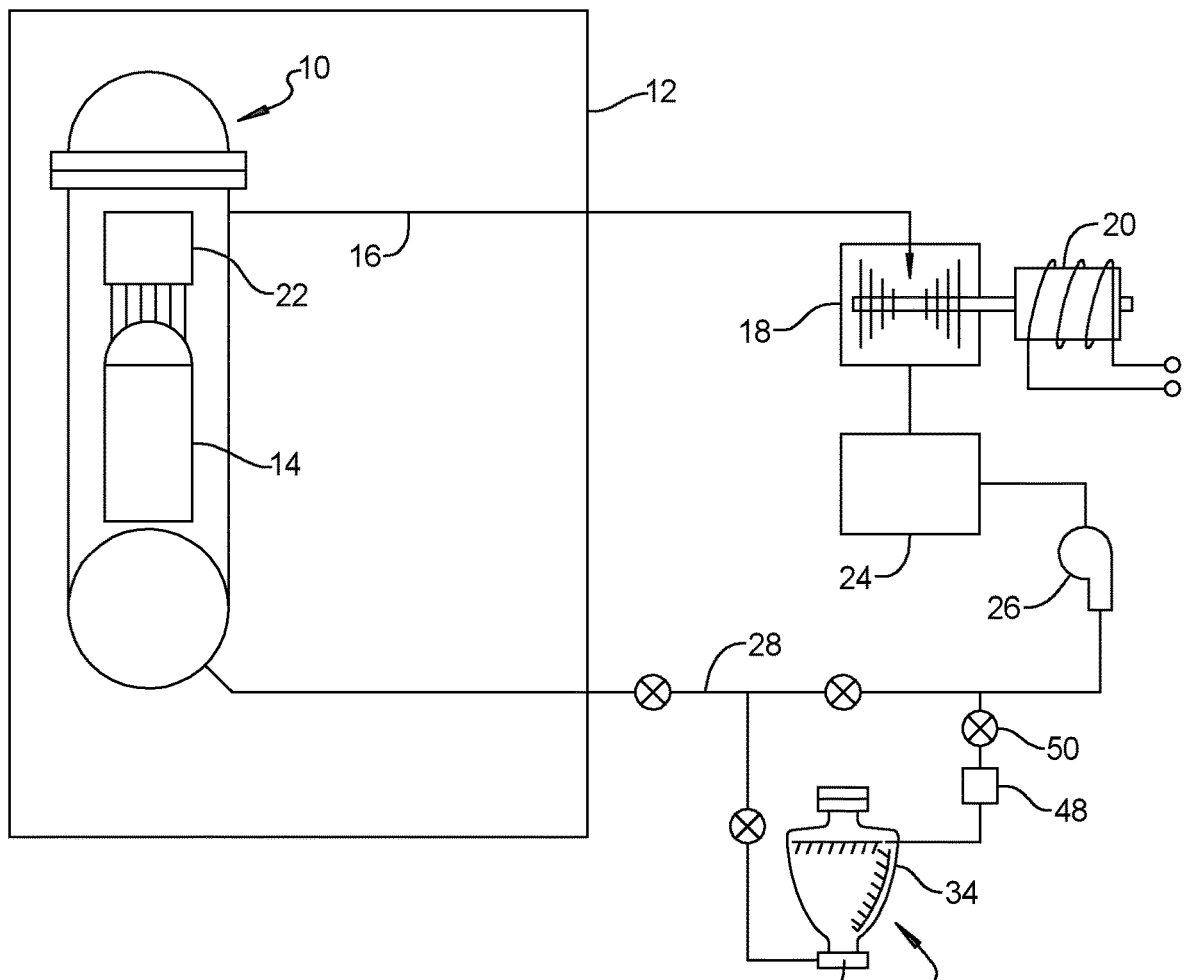
FIG. 1 is a schematic diagram of a boiling water reactor system having a dry standby liquid control system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a boiling water nuclear reactor system is generally shown including a reactor vessel 10 disposed within a containment drywell 12. A reactor core 14 is disposed within the reactor vessel 10 and a steam line 16 extends from the reactor vessel 10 to a turbine 18 that drives an electrical generator 20. Inside the boiling water reactor vessel 10, a steam water mixture is produced when very pure water (reactor coolant) moves upward through the reactor core 14 absorbing heat. The steam-water mixture leaves the top of the reactor core 14 and enters a moisture separator 22 where water droplets are removed before the steam is allowed to enter the steam line 16. The steam line 16, in turn, directs the steam to the turbine 18 causing it to turn the turbine and the attached electrical generator 20. The unused steam can be exhausted to a condenser 24 where it is condensed into water. The resulting water can be pumped out of the condenser and back to the reactor vessel 10 by a pump 26 via a high pressure water return line 28.

Figure 3:
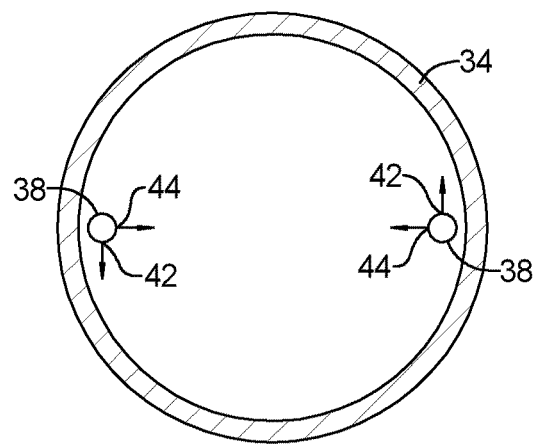
FIG. 3 is a schematic sectional view of the standby vessel illustrating the direction of the mixing holes in the interior pipe system.
Figure 2:
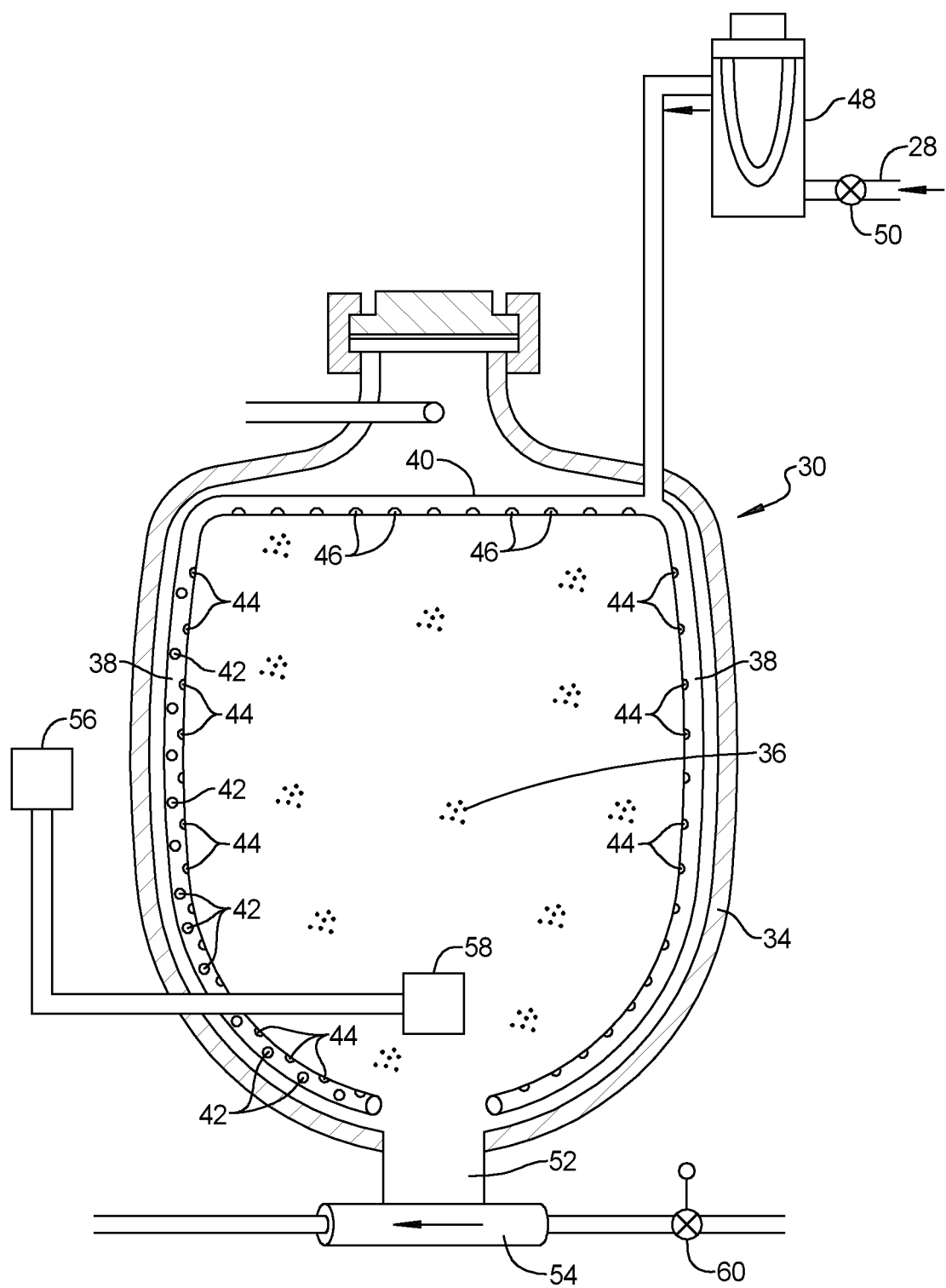
FIG. 2 is a schematic diagram of the dry standby liquid control system according to the principles of the present disclosure.

According to some principles of the present disclosure, a dry standby liquid control system 30 can be provided in communication with the high pressure water return line 28 via a closed valve 34. Alternatively, the dry standby liquid control system 30 can be provided separate from the water return line 28 in communication with an alternative high pressure water line. With reference to FIGS. 1 and 2, the dry standby liquid control system 30 can include a standby vessel 34 containing dry sodium pentaborate powder 36 or other dry powder containing a desired (or, alternatively a predetermined) amount of boron. The standby vessel 34 includes an interior pipe system 38 that can include at least one and optionally plural pipe(s) 38 extending vertically along an interior sidewall of the standby vessel 34 and a pipe 40 extending along an upper region of the standby vessel 34. The pipes 38 and 40 are provided with a plurality of mixing holes wherein the mixing holes in the pipes 38 extending along the sidewalls can be designed to induce swirl within the standby vessel 34. In particular, as best shown in FIGS. 2 and 3, the mixing holes include a first plurality of mixing holes 42 directed generally tangential to the interior sidewall of the standby vessel 34 and a second plurality of mixing holes 44 directed toward a center of the standby vessel 34. In addition, the pipe 40 extending along an upper region of the standby vessel can be straight, ring shaped or partially ring-shaped and can include a plurality of relatively larger mixing holes 46.

An optional heater 48 and a valve 50, which is normally closed, can be provided upstream of the standby vessel 34. The standby vessel 34 is provided with a valve 52 at a lower end of the vessel along with an eductor mixer 54 so that upon introduction of high pressure heated water into the standby vessel 34 the valve 52 can be opened and the eductor mixer 54 can be operated to inject a liquid boron slurry into the reactor vessel 10 to bring the reactor to a shutdown state. The standby vessel 34 may also be provided with a drying system 56 that can include a heater and a blower for blowing warm dry air into the standby vessel 34 via a filter 58 for maintaining the powder 36 in a dry state. The standby vessel 34 can also include a flush valve 60. Additional valves can be employed in the water return line 32 to bypass the dry standby liquid control system 30. The dry standby liquid control system eliminates the need to maintain and test a wet slurry of previous standby liquid control systems. The dry standby liquid control system 30 can also replace standby liquid control systems of existing boiling water reactor systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dry standby liquid control system for a nuclear reactor, comprising:
   a standby vessel including dry powder, the dry powder including boron;
   a high pressure water supply in communication with the standby vessel via a first closed valve, the standby vessel being in communication with a reactor vessel via a second closed valve, the high pressure water supply being connected to an interior pipe system having a plurality of mixing holes within the standby vessel.

2. The dry standby liquid control system for a nuclear reactor according to claim 1, wherein the high pressure water supply includes a heater.

3. The dry standby liquid control system for a nuclear reactor according to claim 1, wherein the second closed valve is disposed in a bottom of the standby vessel in communication with a mixer eductor disposed on an outboard side of the second closed valve and in communication with the reactor vessel.

4. The dry standby liquid control system for a nuclear reactor according to claim 1, wherein the dry powder containing boron includes dry sodium pentaborate.

5. The dry standby liquid control system for a nuclear reactor according to claim 1, wherein the interior pipe system includes at least one pipe extending along an interior sidewall of the standby vessel.

6. The dry standby liquid control system for a nuclear reactor according to claim 5, wherein the interior pipe system further includes a portion extending along an upper region of the vessel.

7. The dry standby liquid control system for a nuclear reactor according to claim 5, wherein the plurality of water mixing holes are arranged in the at least one pipe to induce a swirl within the standby vessel.

8. The dry standby liquid control system for a nuclear reactor according to claim 7, wherein the plurality of water mixing holes include a first plurality of water mixing holes directed generally tangential to the interior sidewall of the standby vessel and a second plurality of water mixing holes directed toward a center of the standby vessel.

9. A boiling water reactor system, comprising:
   a reactor vessel including a reactor core;
   a steam line in communication with the reactor core and a turbine that is connected to an electrical generator;
   a standby vessel including dry powder, the dry powder including boron and including a high pressure water supply in communication with the standby vessel via a first closed valve, the standby vessel being in communication with the reactor vessel via a second closed valve, wherein the high pressure water supply being connected to an interior pipe system having a plurality of mixing holes disposed within the standby vessel.

10. The boiling water reactor system according to claim 9, wherein the second closed valve is disposed in a bottom of the standby vessel in communication with a mixer eductor disposed on an outboard side of the second closed valve and in communication with the reactor vessel.

11. The boiling water reactor system according to claim 9, wherein the dry powder containing boron includes dry sodium pentaborate.

12. The boiling water reactor system according to claim 9, wherein the interior pipe system includes at least one pipe extending along an interior sidewall of the standby vessel.

13. The boiling water reactor system according to claim 12, wherein the interior pipe system further includes a portion extending along an upper region of the vessel.

14. The boiling water reactor system according to claim 12, wherein the plurality of water mixing holes are arranged in the at least one pipe to induce a swirl within the standby vessel.

15. The boiling water reactor system according to claim 14, wherein the plurality of water mixing holes include a first plurality of water mixing holes directed generally tangential to the interior sidewall of the standby vessel and a second plurality of water mixing holes directed toward a center of the standby vessel.

\* \* \* \* \*